United States Patent [19]

Yoshikawa et al.

[11] Patent Number: 4,875,450
[45] Date of Patent: Oct. 24, 1989

[54] IGNITION TIMING CONTROLLING DEVICE FOR AN INTERNAL COMBUSTION ENGINE

[75] Inventors: Haruhiko Yoshikawa, Niiza; Makoto Kawai, Tokorozawa, both of Japan

[73] Assignee: Honda Giken Kogyo Kabushiki Kaisha, Tokyo, Japan

[21] Appl. No.: 143,333

[22] Filed: Jan. 13, 1988

[30] Foreign Application Priority Data

Jan. 13, 1987 [JP] Japan .................................. 62-5638
Jan. 16, 1987 [JP] Japan .................................. 62-7627

[51] Int. Cl.⁴ .............................................. F02P 5/145
[52] U.S. Cl. ...................................... 123/425; 123/422
[58] Field of Search ........................ 123/425, 435, 422

[56] References Cited

U.S. PATENT DOCUMENTS

| 4,190,027 | 2/1980 | Inui et al. | 123/425 |
| 4,391,248 | 7/1983 | Latsch | 123/425 |
| 4,606,312 | 8/1986 | Nakano et al. | 123/435 |
| 4,694,799 | 9/1987 | Yagi et al. | 123/425 |
| 4,709,678 | 12/1987 | Yagi et al. | 123/425 |
| 4,741,310 | 5/1988 | Yagi et al. | 123/425 |
| 4,745,902 | 5/1988 | Yagi et al. | 123/425 |
| 4,748,952 | 6/1988 | Yagi et al. | 123/425 |

FOREIGN PATENT DOCUMENTS

| 49-29209 | 8/1974 | Japan . | |
| 58-190531 | 11/1983 | Japan | 123/435 |
| 58-211545 | 12/1983 | Japan | 123/435 |
| 59-18267 | 1/1984 | Japan | 123/425 |
| 59-49788 | 4/1984 | Japan . | |
| 62-35075 | 2/1987 | Japan . | |

Primary Examiner—Andrew M. Dolinar
Attorney, Agent, or Firm—Birch, Stewart, Kolasch & Birch

[57] ABSTRACT

An ignition timing controlling device for an internal combustion engine includes a reference position signal generating circuit for generating a reference position signal each time the rotational angular position of a crank of an internal combustion engine reaches a reference angular position. A pressure indicating signal generating circuit generates a pressure indicating signal indicative of an internal pressure of a combustion chamber of the engine. A peak detecting circuit generates a pressure indicating peak value, a position signal indicative of a maximum peak value and a position of the pressure indicating signal after generation of a reference position signal until generation of a next reference position signal. An ignition instructing circuit is provided for instructing ignition at an ignition angle corresponding to the pressure indicating peak value and the position signal. The ignition instructing circuit delivers an ignition instruction at an ignition timing depending upon a history of change of the pressure indicating peak position while the rate of change of the pressure indicating peak value is low. The ignition instructing circuit delivers an ignition instruction at an ignition timing independent of the pressure indicating peak position when the engine is operating at a low speed and the rate of change of the pressure indicating peak value is high.

9 Claims, 7 Drawing Sheets

IGNITION TIMING CONTROLLING DEVICE FOR AN INTERNAL COMBUSTION ENGINE

BACKGROUND OF THE INVENTION

1. Field of the Invention

This invention relates to an ignition timing controlling device for an internal combustion engine of a pressure indication detecting type.

2. Description of Background Art

Figure 1:
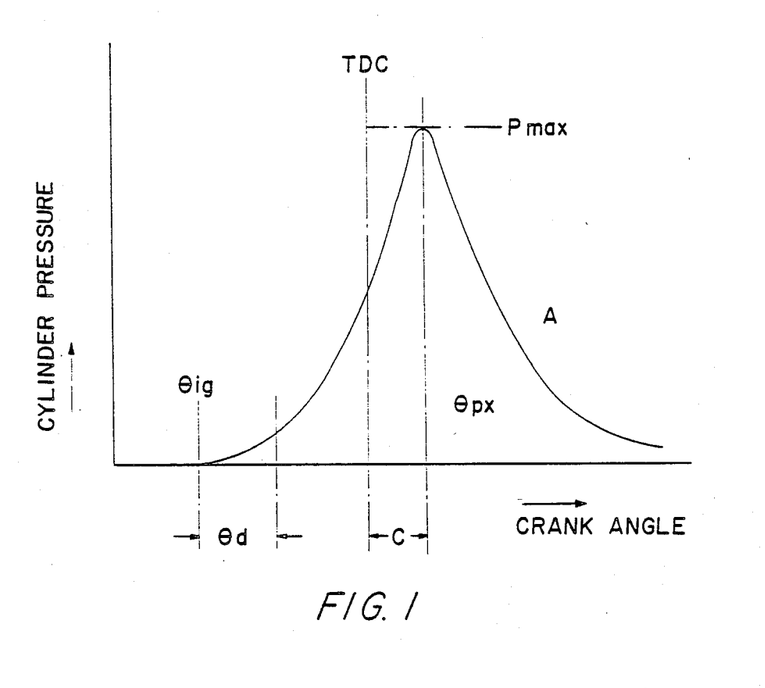
FIG. 1 is a graph illustrating a change of the internal pressure of an engine cylinder.

It is known that during the operation of an internal combustion engine changes in the internal pressure of the combustion chamber occur as shown by curve A in FIG. 1. If an ignition system is triggered at an ignition angle $\theta_{IG}$, then air fuel mixture is ignited with an ignition delay $\theta d$. Thereafter, the cylinder internal pressure follows a process wherein it rises suddenly and then is reduced, passing a maximum pressure peak Pmax (hereinafter referred to as pressure indicating peak).

It is known that the angular position of a crank at the pressure indicating peak is related to a condition in which an engine exhibits its maximum output power. It was experimentally ascertained that the crank angular position of the pressure indicating peak at which the maximum output power can be provided is 12 to 13 degrees after the top dead center (hereinafter referred to as ATDC) as shown in FIG. 1. Thus, an ignition timing controlling device of the pressure indication detection type wherein the ignition timing $\theta_{IG}$ is controlled such that the pressure indicating peak may coincide with an ideal peak range of ATDC 12 to 13 degrees is already known, for example, by Japanese Patent Publication No. 49-29209.

Such an ignition timing controlling device directly detects an internal pressure of a cylinder and obtains pressure indicating peak position data at each cycle of an engine from a pressure indicating signal indicative of the cylinder internal pressure. The device then compares the pressure indicating peak position data with data of an aimed position in order to cause a lead or a lag of the ignition timing at each engine cycle.

A controlling system for such an ignition timing controlling device as described above wherein an ignition timing is decided depending upon an average value of pressure indicating peak position changes, while ignoring a peak position in a misfire cycle, and so on in order to stabilize operation of an engine is already proposed in Japanese Patent Application No. 60-175182 filed by the present inventor.

However, in such an ignition timing controlling system, the stability of operation of an engine is satisfactory but the responsiveness during transition, such as during sudden acceleration, is not always satisfactory.

During normal operation of an engine, the change of the internal pressure of a cylinder presents a maximum peak at or around the top dead center as described above. However, when either the engine or an indicative pressure detecting signal system thereof is in an abnormal condition, the indicative pressure signal does not exhibit such a change as shown by the curve in FIG. 1. A method of detecting such an abnormal condition is already known by Japanese Utility Model Laid-Open No. 59-49788 wherein an abnormal condition is detected from a changing manner of the indicative pressure peak value within one engine cycle.

Meanwhile, when it is intended to obtain an ignition timing controlling device of the indicative pressure detecting type which can be used both for a 2-cycle engine and a 4-cycle engine, it is necessary to detect suction and exhaust strokes of the 4-cycle engine as so-called waste firing cycles. However, since such a waste firing cycle is not an abnormal condition, it cannot be detected by the art of Japanese Utility Model Laid-Open No. 59-49788 mentioned above.

SUMMARY OF THE INVENTION

Accordingly, it is an object of the present invention to provide a pressure indicating ignition timing controlling device which is improved in transition responsiveness while maintaining stability of operation of an engine.

In an ignition time controlling device according to the present invention, when the rate of change of a pressure indicating peak value becomes greater than a predetermined value, it is determined that a throttle valve is being opened suddenly, and so far as the engine is operating at a lower speed, the ignition timing is set to a fixed ignition angle such as a maximum torque generating minimum lead angle value (hereinafter referred to as $MBT_{WOT}$) when the throttle is fully open.

According to another object of the present invention, an ignition timing controlling device is provided for an internal combustion engine of the indicative pressure detecting type wherein a so-called waste firing cycle can be detected without using a special device and accurate control of the engine can be attained.

In an ignition timing controlling device for an internal combustion engine according to the present invention, a present time value and a preceding time value of indicative pressure peak values which are obtained successively for individual engine cycles are compared with each other, and when the present time value is smaller than the preceding time value by a value much greater than a predetermined value, the present time cycle is determined as a waste firing cycle and the preceding time indicative pressure peak value is replaced by the present time indicative pressure peak value.

Further scope of applicability of the present invention will become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3(A)–3(G) illustrate signal waveforms showing the operation of the device shown in FIG. 2;

DETAILED DESCRIPTION OF THE PREFERRED EMBODIMENTS

Figure 2:
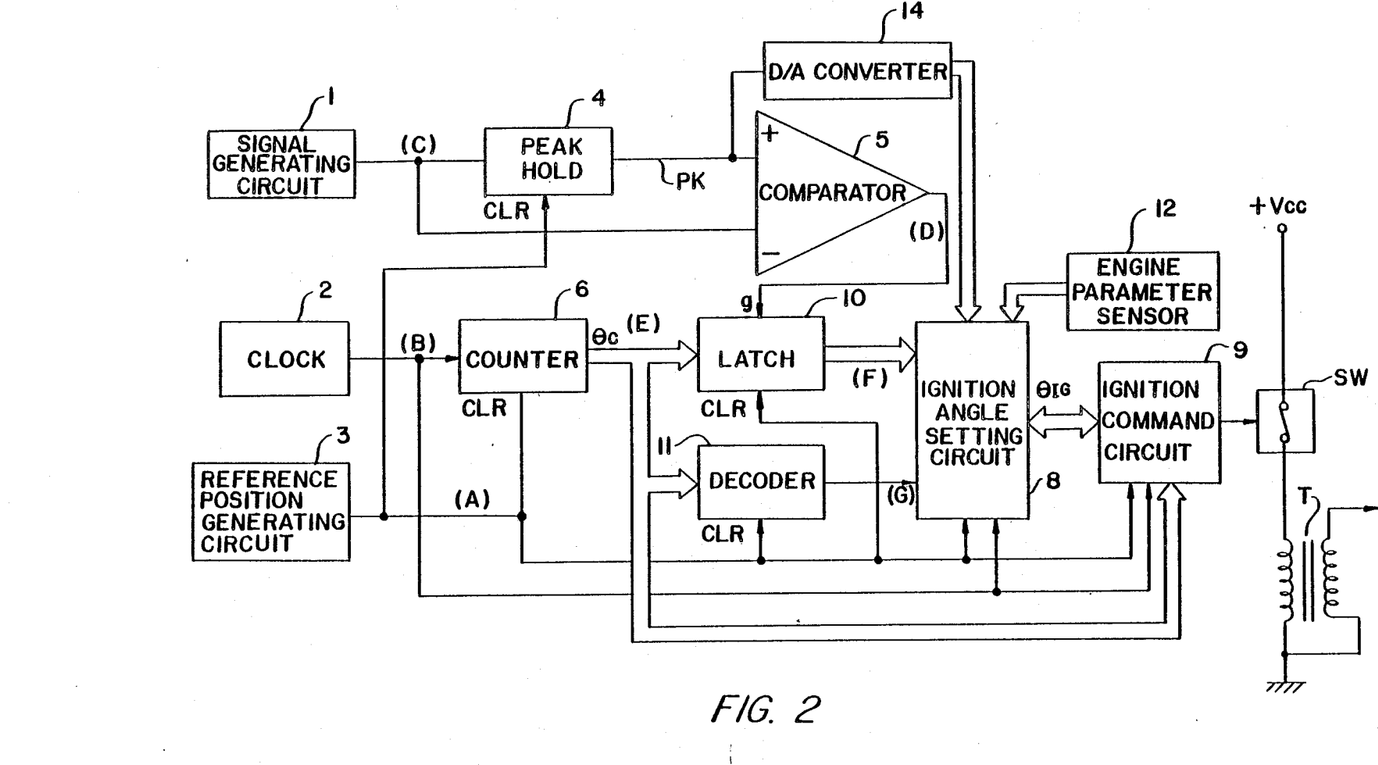
FIG. 2 is a block diagram showing an embodiment of the present invention.

FIG. 2 shows an ignition timing controlling device according to the present invention. The device shown includes a pressure indicating signal generating circuit 1 which is obtained by closely fitting a pressure sensor such as a piezoelectric element in a through hole perforated in a member such as a cylinder head defining a combustion chamber of an internal combustion engine (not shown) in such a manner that a detecting head of the pressure sensor may be exposed to the combustion chamber or by some other means.

A clock generating circuit 2 generates, for example, 360 clock pulses for one cycle of the engine in synchronism with rotation of the engine. A means for producing clock pulses in synchronism with the rotation of the engine is known, for example, a combination of a disk which rotates in synchronism with rotation of a crankshaft and has a large number of slits formed in an equidistantly spaced relationship therein with a photocoupler which provide output signals in the form of clock pulses.

A reference position generating circuit 3 generates a reference position signal which indicates that the angular position of the crank reaches a reference position corresponding to, for example, 90 degrees before the top dead center (hereinafter referred to as BTDC). Such a reference position signal can be produced by a reference position signal producing photocoupler which may be provided for reference position signal producing slits additionally formed in the slit disk which is used for the clock generating circuit 2.

A peak hold circuit 4 holds a maximum value of a pressure indicating signal after it has been cleared by a reference position signal. A comparator circuit 5 is connected to the peak hold circuit 4. The comparator circuit 5 generates a peak detecting signal when the pressure indicating signal itself becomes smaller than its maximum value.

A counter 6 for measuring a crank angular position counts the clock pulses and is cleared by a reference position signal. The count value $\theta c$ of the counter 6 is, for example, an 8 bit data, and indicates a present value of the crank angle. A latch circuit 10 latches a count value of the counter 6 each time a peak detecting signal from the comparator circuit 5 is supplied to the gate terminal g of the latch circuit 10.

Meanwhile, a decoder 11 supplies a reading instruction signal to an ignition angle setting circuit 8 when the count value of the counter 6 reaches, for example, 154. The count value 154 corresponds to a crank angle greater than he crank angle at which a pressure indicating peak value appears. Such a reading timing is obtained at which an instruction signal is not influenced by a valve seating noise of an exhaust valve, even if such a valve seating noise is mixed into the instruction signal. In response to this, the ignition angle setting circuit 8 reads the contents of the latch circuit 10 and judges the latched contents as a peak position data $\theta px$ on the crank angle.

It is to be noted that an alternative construction is also possible wherein the latched contents are supplied to the ignition angle setting circuit 8 via a gate circuit which is opened in response to a reading instruction signal from the decoder 11. The ignition angle setting circuit 8 is constituted from a microprocessor and so on and supplies a desired ignition angle $\theta_{IG}$ data to the ignition instructing circuit 9 depending upon a peak position data $\theta px$ supplied thereto in accordance with a program which will be hereinafter described. The ignition instructing circuit 9 detects a crank angle present value from the count value $\theta c$ of the counter 6. When the count value $\theta c$ coincides with the input $\theta_{IG}$, the ignition instructing circuit 9 instructs an ignition switch SW to open. Consequently, an ignition current flows through a secondary coil of an ignition transformer T to cause ignition by an ignition plus (not shown). It is to be noted that an ignition instructing means is formed by the ignition angle setting circuit 8 and the ignition instructing circuit 9. Further, the ignition angle setting circuit 8 may have a mode in which it operates in response to various engine parameters from engine parameter sensors 12, that is, an engine rotational frequency Ne, a suction negative pressure $P_B$, a throttle opening $\theta th$, an engine coolant temperature $T_W$ and so on. Further, the ignition angle setting circuit 8 supplies a comparison reference data for the comparator circuit to an analog to digital converter.

Figure 3A:
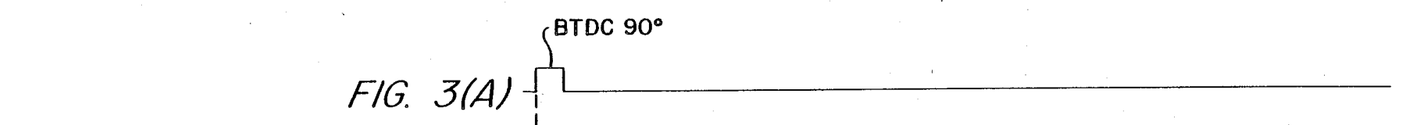
Figures 3B, 3C, 3D:
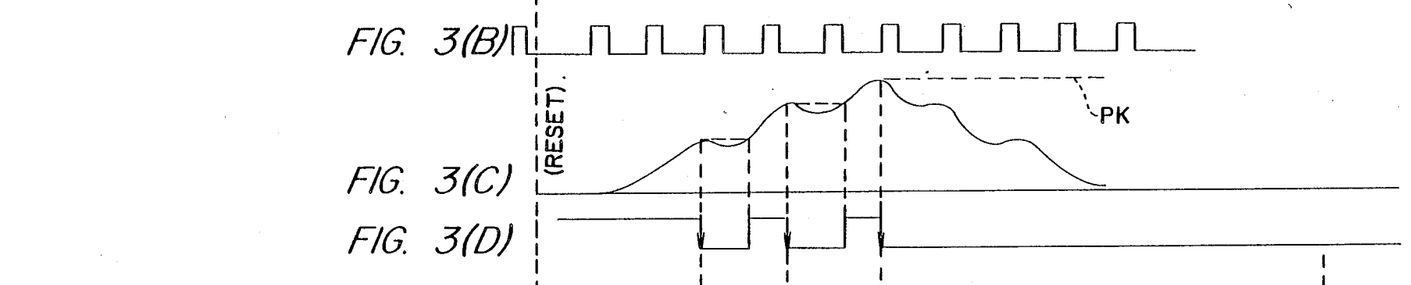
Figure 3E:
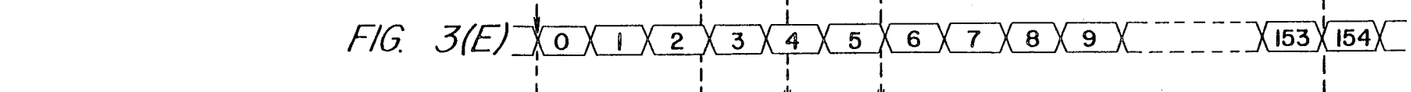

FIGS. 3(A) to 3(F) are signal waveform charts illustrating the operation of the embodiment of the present invention. In particular, a reference position signal and clock pulses are shown in FIGS. 3(A) and 3(B), respectively. A pressure indicating signal changes is shown by a solid line in FIG. 3(C). Accordingly, the output of the peak hold circuit 4 is shown by broken lines in FIG. 3(C). The comparator circuit 5 generates, at each maximum point of the pressure indicating signal, a peak detecting signal as shown in FIG. 3(D). FIG. 3(E) shows a manner of change of the count value $\theta c$ of the counter with numerical values.

Figure 3F:
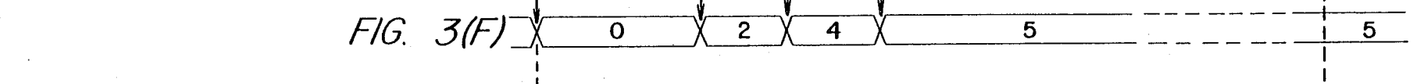
Figure 3G:
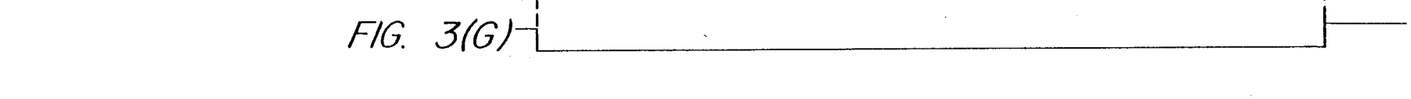

FIG. 3(F) shows a manner of change of the latched contents with numerical values. FIG. 3(G) shows a change of output of the decoder 11, and in this instance, a high level generates a reading instruction signal.

Figure 4:
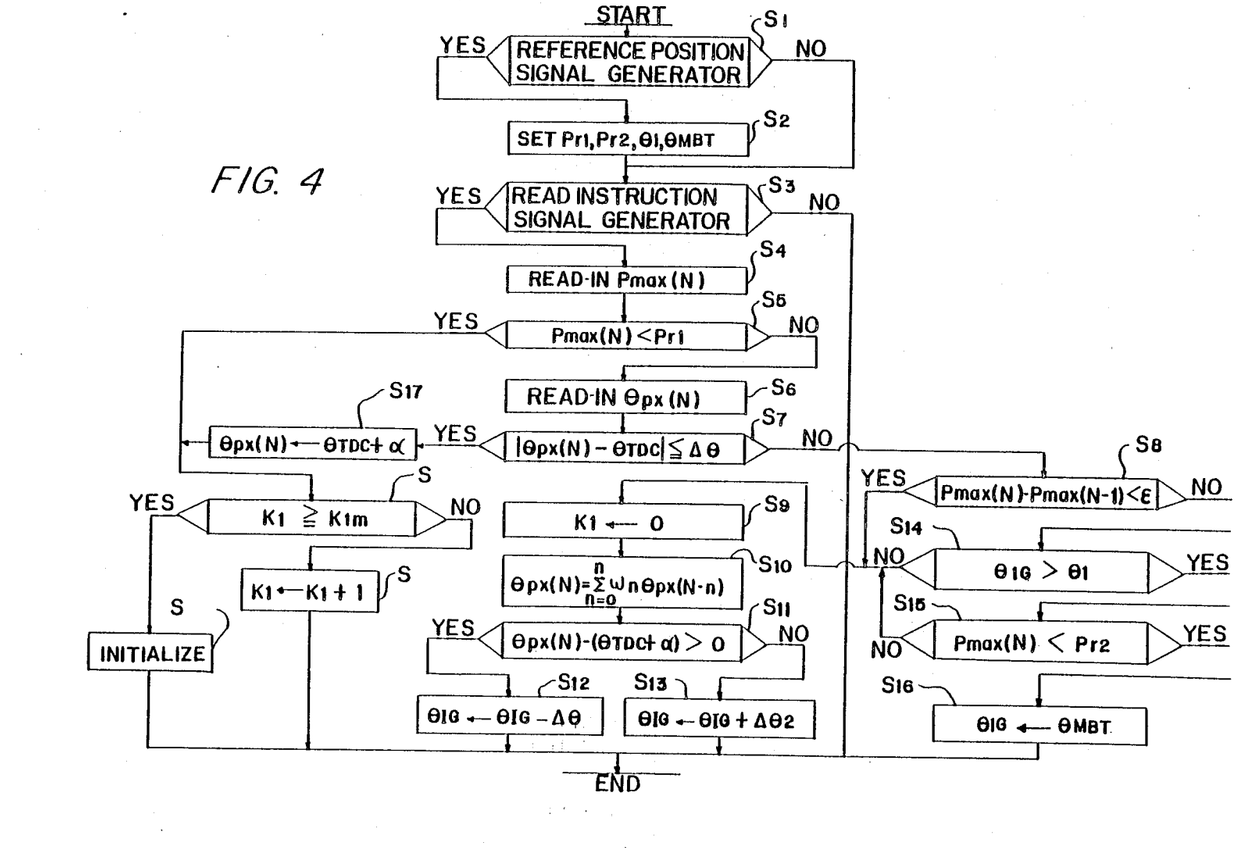
FIGS. 4, 5 and 7 are flow charts showing operational programs of parts of the device of FIG. 2 which are constituted from microprocessors.

As shown in FIG. 4, the ignition angle setting circuit 8 judges whether or not a reference position signal is generated (step $S_1$). If a reference position signal is generated, then first and second comparison reference values $Pr_1$, $Pr_2$, a reference ignition angle $\theta_1$ and a minimum lead angle $\theta_{MBT}$ at which a maximum torque is produced when the throttle is fully open are set from an engine rotational frequency Ne and a maximum peak value Pmax (step $S_2$). Either after completion of step $S_2$ or when no reference position signal is generated, it is judged whether or not a reading instruction signal is generated ($S_3$), and in case a reading instruction signal is produced, a maximum peak value Pmax(N) is read in from the analog to digital converter 14 (step $S_4$) and then it is judged whether or not the maximum peak value Pmax(N) is smaller than the comparison reference value $Pr_1$ (step$S_5$). In case Pmax(N)$\geq Pr_1$, the latched contents of the latch circuit 10 are taken as a peak position data $\theta px(N)$ into the ignition angle setting circuit 8 (step $S_6$).

Subsequently, it is judged whether or not an absolute value of the difference between the peak position data $\theta px(N)$ and a top dead center angle $\theta_{TDC}$ is smaller than a predetermined value $\Delta\theta$(step $S_7$). If $|\theta px(N)-\theta_{TDC}>\theta$, then a difference Pmax(N)—Pmax(N−1)=$\Delta$Pmax between a preceding value and a present value of the maximum value Pmax of the pressure indication is compared with a predetermined value $\epsilon$ (step $S_8$), and in the case when $\Delta$Pmax$<\epsilon$, a variable $K_1$ is reset to 0 (step $S_{11}$), and the present data value is corrected with pressure indicating peak position data values in past (N−1), N−2), ... (N−n)the engine cycles in accordance with an equation $$\theta px(N) = \sum_{n=0}^{n} \omega n \, \theta \, px \, (N - n)$$

in order to promote the stability of a feedback system (step $S_{11}$)

It is also possible, as a concrete example of $\omega n$ of the equation given above, to take an average value of the previous four data and a present data with $\omega_0 = \omega_1 = \omega_2 = \omega_3 = \omega_4 = 1/5$ and $\omega_5 = \omega_6 = \ldots = \omega_n = 0$. The averaging method is not limited to this, and an average of a suitable number of data may be employed. Further it is also possible to take $\omega_n = (1/L)^n (L > 1, n > 1)$.

Thereafter, it is judged whether or not $\theta px$ obtained in this manner is greater than a sum of the top dead center angle $\theta_{TDC}$ and an angle $\alpha$, for example, 12 degrees (step $S_{11}$), and if the former is greater than the latter, the ignition angle $\theta_{IG}$ is made to lead by $\Delta\theta_1$ (step $S_{12}$), but on the contrary if the former is smaller than the latter, then the ignition angle $\theta_{IG}$ is made to lag by $\Delta\theta_2$ (step $S_{13}$). Here, the lead angle $\Delta\theta_1$ and the lag angle $\Delta\theta_2$ need not always be equal values to each other and may be $\Delta\theta_1 > \Delta\theta_2$ or $\Delta\theta_1 < \Delta\theta_2$ depending upon characteristics of the feedback system. Meanwhile, $\Delta\theta_1$, $\Delta\theta_2$ may be a function of a difference between $\theta px(N)$ and $(\theta_{TDC} + \alpha)$.

Figure 6A:
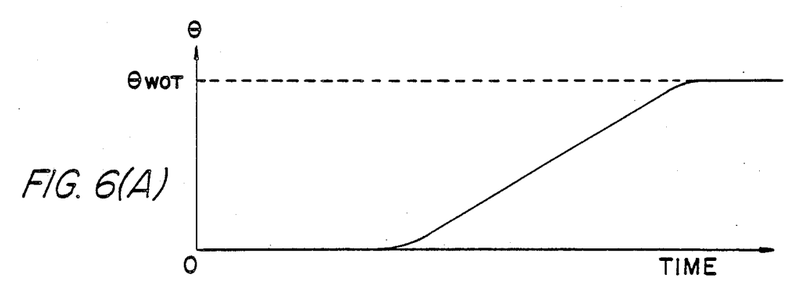
FIGS. 6(A) and 6(B) are graphs showing manners of change of the pressure indicating peak relative to a change of throttle opening upon sudden opening of the throttle.
Figure 6B:
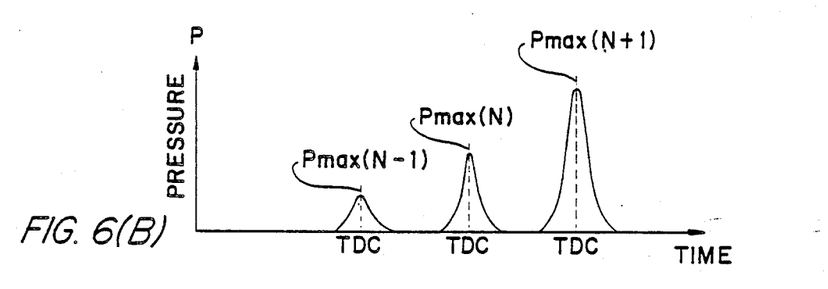

To the contrary, when $\Delta Pmax > \epsilon$, if the ignition angle is $\theta_{IG} > \theta_1$ and $Pmax(N) < Pr_2(Pr_2 > Pr_1)$ (steps $S_{14}$, $S_{15}$), then it is judged that sudden acceleration during low speed operation of the engine is proceeding, and the ignition angle $\theta_{IG}$ is fixed to $\theta_{MBT}$ which is already set (step $S_{16}$). In this connection, FIG. 6(A) shows an example of a change in the throttle opening $\theta$ upon sudden opening of the throttle, and to the contrary, FIG. 6(B) shows a manner of change of the pressure indicating peak value Pmax at each TDC following such change of the throttle opening. As also seen from FIGS. 6(A) and 6(B), the pressure indicating peak value changes to a large extent upon sudden opening of the throttle. Accordingly, if Pmax exceeds a predetermined value, it is possible to judge that the throttle is being suddenly opened. It is to be noted that if the ignition angle $\theta_{IG}$ of the engine is $\theta_{IG} \leq \theta_1$ and $Pmax(N) \geq Pr_2$, this indicates that the engine is operating at a middle or high speed. Accordingly, even if $\Delta Pmax$ becomes greater than the predetermined value, such fixed ignition is not effected. On the other hand, if $|\theta px(N) - \theta_{TDC}| \leq \Delta\theta$, then is is judged that combustion fails in the cylinder due to misfiring so that the pressure indicating peak position appears near $\theta_{TDC}$. Accordingly, in order to ignore the peak position data $\theta px(N)$ taken in, $\theta px(N)$ is set to $\theta_{TDC} + \alpha$(step $S_{17}$) Thereafter, so far as $K_1 < K_1 m$, $K_1$ is set to $K_1 + 1$ (steps $S_{18}$, $S_{19}$). However, if misfiring occurs successively so that $K_1$ becomes $K_1 \geq K_1 m$, then initialization (including $\theta_{IG} < -\theta_{IGO}$, $K_1 < -0$) is effected in order to allow the ignition timing to be set again (step $S_{20}$).

Meanwhile, when $Pmax(N) < Pr_1$ (step $S_5$), misfiring is judged, and execution of the step $S_{18}$ of the misfiring cycle described above is entered.

Such a cycle of operations of steps $S_1$ to $S_{20}$ from start to end as described above are successively executed in response to the clock pulses described above or to different clock pulses of a predetermined period. Further, the cyclic operations are repeated. This also applies to a program as set forth hereinbelow.

While in such operations feedback control is employed such that the peak position data $\theta px$ may become equal to $\theta_{TDC} + \alpha$, the peak position data $\theta px$ may be controlled otherwise such that it may be a value within a range of $\theta_{TDC} + \alpha \pm \beta(X)$. Here, $\beta(X)$ may be any one of an engine rotational frequency Ne, a throttle opening $\theta th$ and an engine suction negative pressure $P_B$. This will allow improvement in stability of the entire feedback system.

Figure 5:
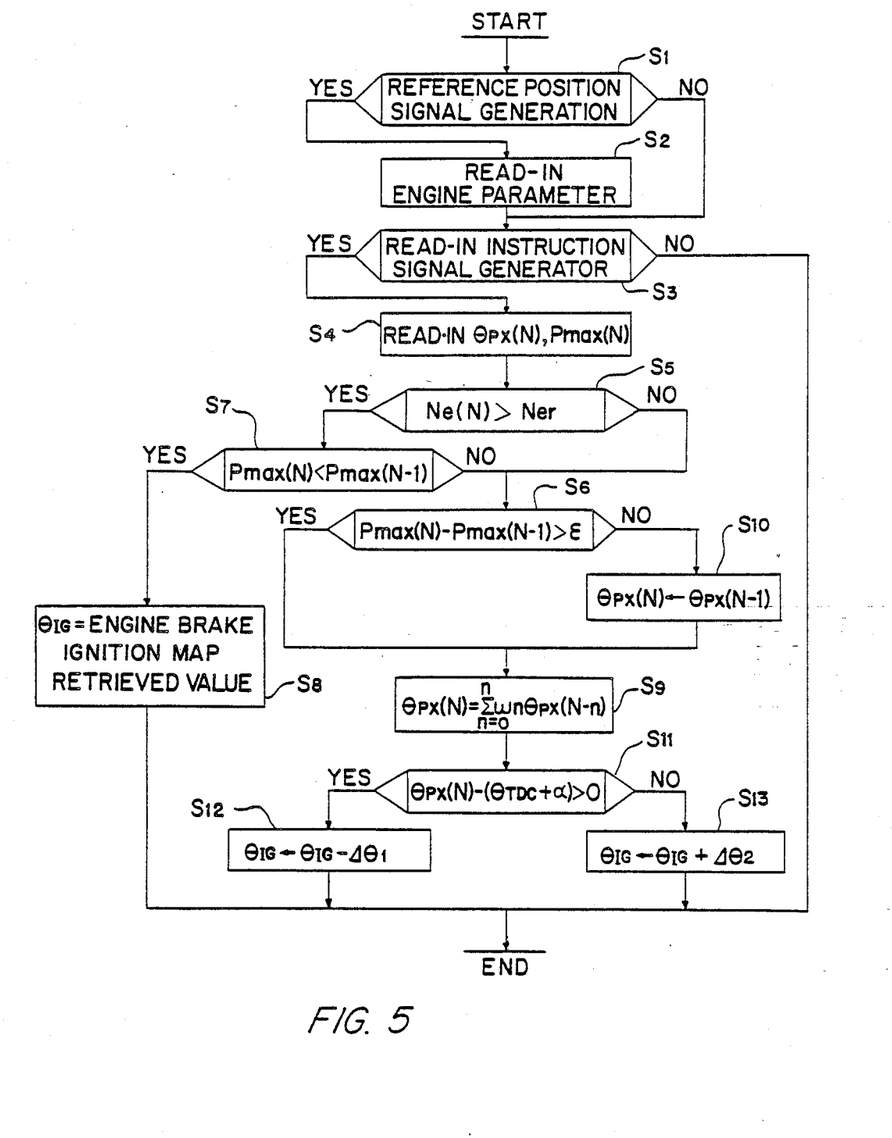

As shown in FIG. 5, the ignition angle setting circuit 8 judges whether or not a reference position signal is generated (step $S_1$), and if arreference position signal is generated, then the ignition angle setting circuit 8 senses an engine rotational frequency Ne, a throttle opening $\theta th$ and some other engine parameters from the engine parameter sensors 12 (step $S_2$). After step $S_2$ or when no reference position signal is generated at step $S_1$, it is judged whether or not a reading instruction signal is generated (step $S_3$), and if there is a reading instruction signal generated, a maximum peak value Pmax(N) is read in from the analog to digital converter 14 (step $S_4$). Subsequently, the engine rotational frequency Ne(N) is compared with a judgment value Ner (step $S_5$). If Ne(N) < Ner, then it is judged whether or not a value of the difference of a preceding time value Pmax(N−1) from a present time value Pmax(N) of the peak value is greater than $\epsilon$(step $S_6$). In the case where Ne(N) > Ner and besides the present time value Pmax(N) is smaller than the preceding time value Pmax(N−1), step $S_6$ is subsequently entered (step $S_7$) On the contrary, in case Pmax(N) < Pmax(N−1), it is judged that the engine is in its engine brake condition and consequently the ignition angle $\theta_{IG}$ is set to a value retrieved from an ignition map for an engine brake condition using the engine rotational frequency Ne and so on as parameters (step $S_8$). It is to be noted that an engine brake condition may be discriminated from the facts that Ne(N) > Ner and the throttle opening $\theta th$ is smaller than a predetermined value $\theta r$.

In case $Pmax(N) > Pmax(N-1) + \epsilon$, it is presumed that there has been an explosion in the present time cycle. Accordingly, the ignition angle setting circuit 8 determines that the peak position $\theta px(N)$ is a correct value and thus enters a next step $S_9$. To the contrary, in case $Pmax(N) < Pmax(N-1) + \epsilon$, no explosion has occurred in the present time cycle, and it is judged that the present time cycle is a suction or exhaust stroke or a misfiring cycle in a 4-cycle engine, that is, an abnormal cycle anyway in which a correct peak value $\theta px$ cannot be anticipated. Accordingly, in this case, the preceding time value $\theta px(N-1)$ is replaced by the present time value $\theta Px(N)$ (step $S_{10}$), and after then, step $S_9$ is entered. At step $S_9$, the present time data value is corrected with indicative pressure peak position data values in past (N−1), (N−2), ... (N−n)th engine cycles in accordance with an equation $$\theta px(N) = \sum_{n=0}^{n} \omega n \, \theta \, px \, (N - n)$$

in order to promote the stability of a feedback system.

It is also possible, as a concrete example of $\omega n$ of the equation given above, to take an average value of the previous four data and a present date with $\omega_0 = \omega_1 = \omega_2 = \omega_3 = \omega_4 = 1/5$ and $\omega_5 = \omega_6 = \ldots = \omega_n - 0$.

The averaging method is not limited to this, and an average of a suitable number of that there has been an expl ta may be employed. Further, it is also possible to take $\omega_n = (1/L^n(L>1, n>1)$.

Thereafter, it is judged whether or not $\theta px$ obtained in this manner is greater than a sum of the top dead center angle $\theta_{TDC}$ and an angle $\alpha$, for example, 12 degrees (step $S_{11}$), and if the former is greater than the latter, the ignition angle $\theta_{IG}$ is made to lead by $\Delta\theta_1$ (step $S_{12}$), but on the contrary if the former is smaller that the latter, then the ignition angle $\theta_{IG}$ is made to lag by $\Delta\theta_2$ (step $S_{13}$). Here, the lead angle $\Delta\theta_1$ and the lag angle $\Delta\theta_2$ need not always be equal values to each other and may be $\Delta\theta_1 > \Delta\theta_2$ or $\Delta\theta_1 < \Delta\theta_2$ depending upon characteristics of the feedback system. Meanwhile $\Delta\theta_1$, $\Delta\theta_2$ may be a a function of a difference between $\theta px(N)$ and $(\theta_{TDC} + \alpha)$.

Such a cycle of operations of steps $S_1$ to $S_{20}$ from start to end as described above are successively executed in response to the clock pulses described above or to different clock pulses of a predetermined period, and besides such cyclic operations are repeated. This also supplies to a following program.

While in such operations feedback control is employed such that the peak position data $\theta px$ may become equal to $\theta_{TDC} + \alpha$, the peak position data $\theta px$ may be controlled otherwise such that it may be a value within a range of $\theta_{TDC} + \alpha \pm \beta(X)$. Here, $\beta(X)$ may be any one of an engine rotational frequency Ne, a throttle opening $\theta$th and an engine suction negative pressure $P_B$. This will allow improvement in stability of the entire feedback system.

Figure 7:
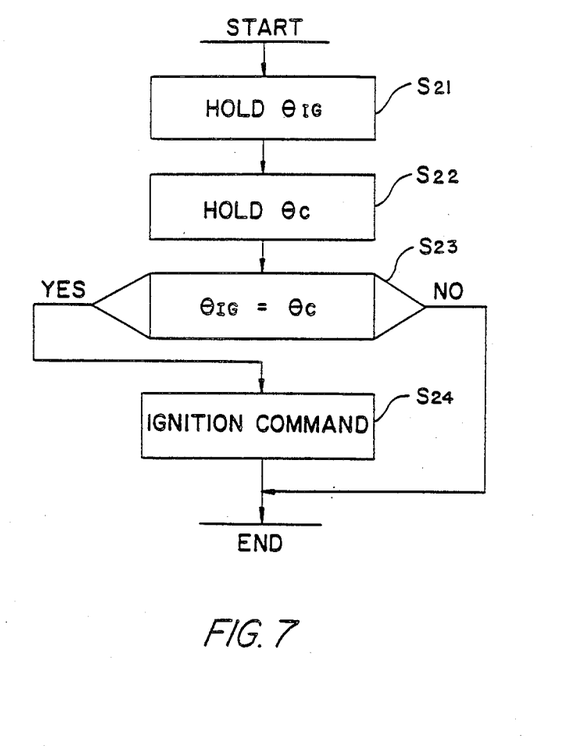

FIG. 7 illustrates an example of operation program where the ignition instruction circuit 9 is formed from a microprocessor. In particular, the ignition instruction circuit 9 takes in an ignition angle data $\theta_{IG}$ from the ignition angle setting circuit 8 (step $S_{21}$) and then takes in a count value $\theta c$ from the counter 6 (step $S_{22}$). The microprocessor of the ignition instruction circuit 9 then judges whether or not the ignition angle data $\theta_{IG}$ and the count value $\theta c$ coincides with each other, and if a condition of $\theta_{IG} = \theta c$ stands, then an ignition instruction is delivered at once (steps $S_{23}$, $S_{24}$) so as to open the ignition switch SW. It is otherwise possible to execute judgment at step $S_{23}$ not with respect to whether or not $\theta_{IG} = \theta c$ but with respect to a difference between $\theta_{IG}$ and $\theta c$ is smaller than $\delta\theta$.

OPERATION OF THE INVENTION

As apparent from the foregoing description, in an ignition timing controlling device for an internal combustion engine according to the present invention, an ignition instruction is delivered at an ignition timing depending upon a history of change of the pressure indicating peak position while the rate $\Delta$Pmax of change of the pressure indicating peak value is low. However, when the engine is operating at a low speed and the rate $\Delta$Pmax of change is high, an ignition instruction is delivered at a fixed ignition timing. Accordingly, sudden acceleration of the engine can be attained in response to a sudden opening of the throttle during low speed operation of the engine while maintaining the stability of operation of the control system. Accordingly, the ignition timing controlling device for an internal combustion engine according to the present invention is desirable.

As apparent from the foregoing description, in an ignition timing controlling device for an internal combustion engine according to the present invention, two successive sample values of the indicative pressure peak value for individual engine cycles are compared with each other. Thereafter, a cycle in which a greater of the two sample values is obtained is determined as an explosion cycle. Thus, since discrimination between an explosion stroke and an exhaust or suction stroke or discrimination of a misfiring cycle is made utilizing an indicative pressure peak signal without using a sensor such as a rotational angle position sensor for a crankshaft, the ignition timing controlling device can be produced at a reduced cost and operates with accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ignition timing controlling device for an internal combustion engine comprising:
   a reference position signal generating means for generating a reference position signal each time the rotational angular position of a crank of an internal combustion engine reaches a reference angular position;
   a pressure indicating signal generating means for generating a pressure indicating signal indicative of an internal pressure of a combustion chamber of said engine;
   a peak detecting means for generating a pressure indicating peak value, a position signal indicative of a maximum peak value and a position of the pressure indicating signal after generation of a reference position signal until generation of a next reference position signal; and
   an ignition instructing means for instructing ignition at an ignition angle corresponding to the pressure indicating peak value and the position signal;
   said ignition instructing means delivers an ignition instruction at an ignition timing depending upon a history of change of the pressure indicating peak position while the rate of change of the pressure indicating peak value is low;
   said ignition instructing means delivers an ignition instruction at an ignition timing independent of the pressure indicating peak position when said engine is operating at a low speed and the rate of change of the pressure indicating peak value is high.

2. An ignition timing controlling device for an internal combustion engine comprising:
   a reference position signal generating means for generating a reference position signal each time the rotational angular position of a crank of an internal combustion engine reaches a reference angular position;
   a pressure indicating signal generating means for generating a pressure indicating signal indicative of an internal pressure of a combustion chamber of said engine;
   a peak detecting means for generating a pressure indicating peak value, a position signal indicative of a maximum peak value and a position of the pressure indicating signal after generation of a reference position signal until generation of a next reference position signal; and an ignition instructing means for instructing ignition at an ignition angle corresponding to the pressure indicating peak value and the position signal;

said ignition instructing means determines when a present time value cycle of said indicative pressure peak value is smaller than a preceding time value of said indicative pressure peak value by a value greater than a predetermined value and judges that the present time value cycle is an abnormal cycle and ignores the present time indicative pressure peak position signal.

3. An ignition timing controlling device for an internal combustion engine according to claim 2, wherein said ignition instructing means does not judge an abnormal cycle when said ignition instructing means detects an engine brake condition.

4. An ignition timing controlling device for an internal combustion engine comprising:

a reference position signal generating means for generating a reference position signal each time the rotational angular position of a crank of an internal combustion engine reached a reference angular position;

a pressure indicating signal generating means for generating a pressure indicating signal indicative of an internal pressure of a combustion chamber of said engine;

a peak detecting means for generating a pressure indicating peak value, a position signal indicative of a maximum peak value and a position of the pressure indicating signal after generation of a reference position signal until generation of a next reference position signal; and an ignition instructing means for instructing ignition at an ignition angle corresponding to the pressure indicating peak value and the position signal;

said ignition instructing means determines when a present time value cycle of said pressure indicating peak value is smaller than a preceding time value of said pressure indicating peak value by a value greater than a predetermined value and delivers an ignition timing depending upon the history of change of the pressure indicating peak position.

5. An ignition timing controlling device for an internal combustion engine according to claim 4, wherein said ignition instructing means replaces a preceding value of said instruction peak position signal with a present time value of said instruction peak position signal when said ignition instructing means judges that the present cycle is an abnormal cycle.

6. An ignition timing controlling device for an internal combustion engine according to claim 5, wherein said ignition instructing means does not judge an abnormal cycle when said ignition instructing means detects an engine brake condition.

7. An ignition timing controlling device for an internal combustion engine according to claim 4, wherein said ignition instructing means judges that the present time value cycle is an abnormal cycle and ignores the present time indicative pressure peak position signal.

8. An ignition timing controlling device for an internal combustion engine comprising:

a reference position signal generating means for generating a reference position signal each time the rotational angular position of a crank of an internal combustion engine reached a reference angular position;

a pressure indicating signal generating means for generating a pressure indicating signal indicative of an internal pressure of a combustion chamber of said engine;

a peak detecting means for generating a pressure indicating peak value, a position signal indicative of a maximum peak value and a position of the pressure indicating signal after generation of a reference position signal until generation of a next reference position signal;

an ignition instructing means for instructing ignition at an ignition angle corresponding to the pressure indicating peak value and a the position signal; and a detecting means for detecting an acceleration of the engine in response to the rate of change of the pressure indicating peak value, for generating an acceleration signal when the rate of change of the pressure indicating peak value becomes greater than a predetermined value of said indicative pressure peak value;

said ignition instructing means delivers an ignition instruction at an ignition timing independent of the pressure indicating peak position for attaining sudden acceleration of the engine in response to said acceleration signal.

9. The ignition timing controlling device according to claim 8, wherein the ignition timing is a fixed ignition timing for attaining sudden acceleration.

* * * * *